UNITED STATES PATENT OFFICE.

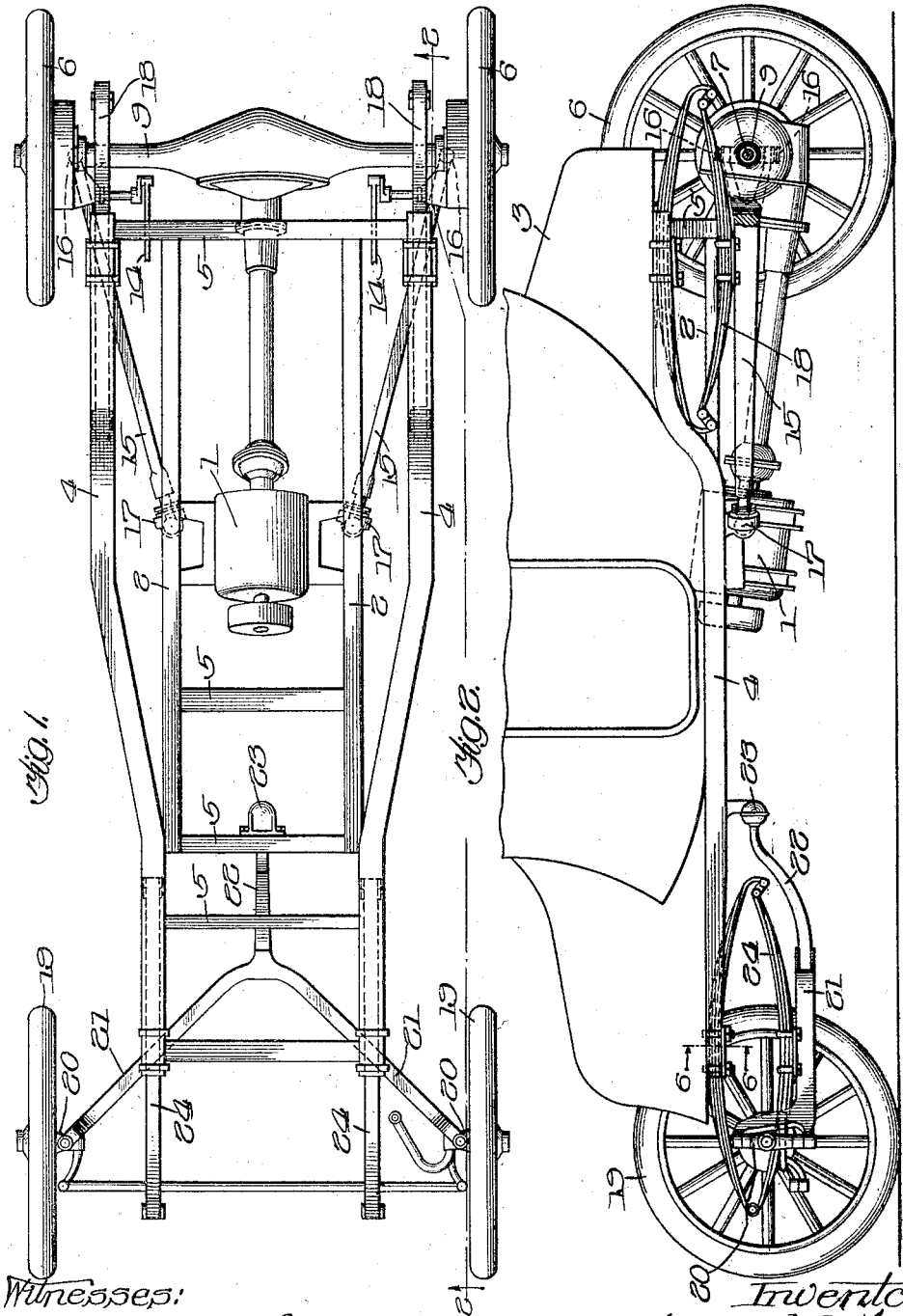

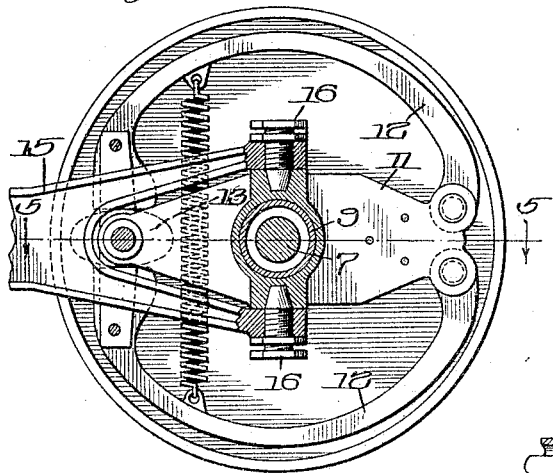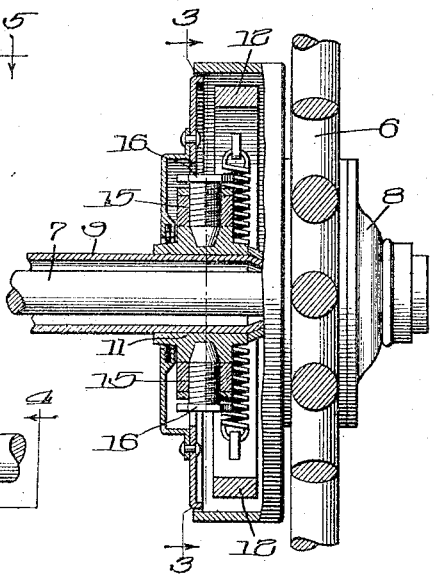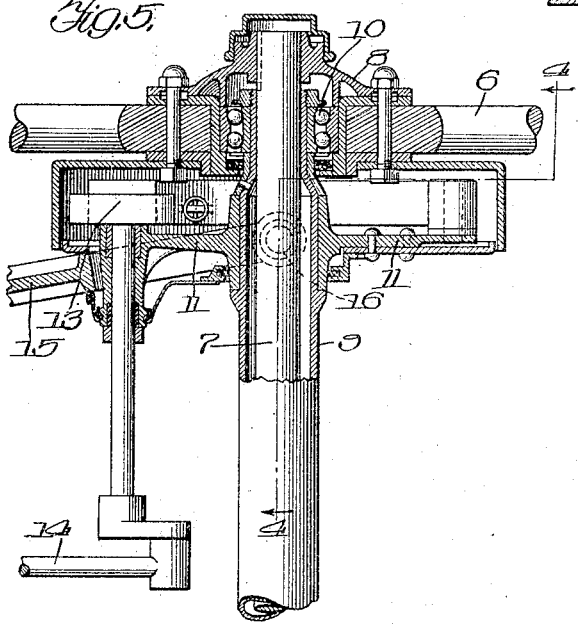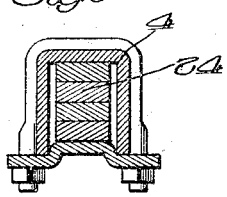

ROLAND S. FEND, OF CHICAGO, ILLINOIS.

WHEELED VEHICLE.

1,210,291.  Specification of Letters Patent.  Patented Dec. 26, 1916.

Application filed October 23, 1913. Serial No. 796,768.

*To all whom it may concern:*

Be it known that I, ROLAND S. FEND, citizen of the United States, residing at Chicago, in the county of Cook and State of Illinois, have invented a certain new and useful Improvement in Wheeled Vehicles, of which the following is a full, clear, concise, and exact description, reference being had to the accompanying drawings, forming a part of this specification.

My invention relates to wheeled vehicles and has among its objects the provision of means for increasing the length of the wheel base for a given location of the vehicle body supporting springs; the provision of means for reducing the amplitude of vibration of the vehicle body supporting springs, the under frame supported by these springs, and parts carried by the under frame; and the provision of means whereby the points of support of the under frame are brought closer to the planes of rotation of the vehicle wheels whereby the tendency of the wheels to be warped from their normal planes upon the application of the brakes and due to the weight supported by the wheels is practically overcome. In the case of self-propelled vehicles or automobiles, by supporting the under frame close to the planes of the propelling vehicle wheels the tendency of these wheels to be warped out of their normal planes by the propelling force is practically eliminated.

The invention has for its further object the provision of means for removing the braking strains from the springs which support the vehicle body whereby these springs are adapted fully to perform their function when the brakes are being applied.

The foregoing and other features of the invention will be fully described in connection with the accompanying drawings showing the preferred embodiment thereof and in which—

Figure 1 is a plan view showing the under frame mounted upon wheels and in condition to have the vehicle body supported thereupon; Fig. 2 is a sectional elevation on line 2—2 of Fig. 1 indicating the lower part of the vehicle body, in position upon the under frame; Fig. 3 is a sectional view on line 3—3 of Fig. 4; Fig. 4 is a view in sectional elevation on line 4—4 of Fig. 5; Fig. 5 is a sectional plan view on line 5—5 of Fig. 3; and Fig. 6 is a detail view illustrating the preferred manner of connecting an elliptic vehicle supporting spring with the under frame of the vehicle.

Like parts are indicated by similar characters of reference throughout the different figures.

The drawings show the invention as being embodied in an automobile but the invention is not to be limited, in all of its characteristics, to self-propelled vehicles. The particular automobile illustrated is one which employs an electric motor 1 mounted in any suitable way upon the motor supports 2 which are rigid with respect to and form a part of the under frame of the vehicle, the vehicle body 3 being mounted upon laterally outsetting portions 4 of the under frame. Braces 5 join the frame members 2, the rear brace 5 being projected laterally there to unite the outer members 4 with the inner members 2, the forward ends of the members 2 being directly fastened to the forward portions of the members 4. A rigid under frame structure is thus produced which not only supports the vehicle body 3 and motor 1 but which may support other equipment of the automobile as, for example, storage batteries in the case of automobiles employing propelling electric motors.

In the embodiment of the invention illustrated the rear wheels 6 are initially propelled by the motor 1 through the intermediation of any well known or suitable power transmission mechanism, that shown including a motor driven driving shaft 7 connected with the central portions of the wheels 6 by the structure most clearly indicated in Fig. 5, which structure includes driving flanges 8 in fixed relation to the driving shaft 7 and bolted at their peripheries to the wheels 6. The driving shaft is provided with a non-rotating shaft casing 9 that supports ball bearing structures 10 upon which the wheels 6 may turn, this shaft casing thus constituting a support carried by the rear wheels and non-rotating therewith.

A brake shoe support 11 is rigidly supported near each end of the shaft casing 9, brake shoes 12 being mounted upon this support. Each brake shoe support 11, in addition to supporting the brake shoes to the rear of the shaft 7, also supports a suitable brake shoe actuating element 13 which is illustrated in the form of a cam located at the forward ends of the brake shoes 12, this cam 13 being placed within the control of the driver of the vehicle through the intermediation of suitable brake actuating lever mechanism 14. Each support 11 also constitutes a mounting for the rear end of a rod 15 which I herein term a reach rod, though such reach rod preferably does not extend clear to the forward end of the under frame. The rear end of each reach rod 15 is desirably bifurcated, the bifurcated branches of each reach rod lying in a substantially vertical plane. Each bifurcated branch is provided at its rear end with a threaded bore to receive a threaded trunnion pin 16 each formed at its inner end to afford pivotal connection between its associate reach rod and the support 11 whereby slight relative motion may be afforded between the frame 11 and the reach rods, as in rounding corners. The forward ends of the reach rods 15 have flexible connection at 17 with the inner members 2 of the under frame, these flexible connections being preferably effected by ball and socket joints to provide universal motion between the forward ends of the reach rods 15 and the under frame. The rear portion of the under frame is supported upon the wheels desirably through the intermediation of elliptic springs 18, though the invention is not to be limited to the character of springs or cushions employed for this purpose. In accordance with the preferred embodiment of the invention these elliptic springs or other cushions are supported upon the reach rods between the ends of said reach rods, whereby the vehicle body 3 has supporting engagement with its rear cushions 18 and said rear cushions are in turn supported by the wheels of the vehicle, between the axes of the forward and rear wheels.

The forward wheels 19 are turned by their contact with the roadway, in accordance with common practice, these wheels being journaled in branches 20 forming parts of well known steering knuckle mechanism. The element 20 thus constitutes a support carried by the front wheels and non-rotating therewith. In accordance with the preferred embodiment of the invention a pair of reach rods 21 is provided at the forward end of the vehicle, each front end of each reach rod 21 being desirably bifurcated as illustrated in Fig. 2 there to have pivotal connection with the associate steering knuckle portion 20 as indicated clearly in Fig. 2. The inner ends of the forward reach rods 21 are desirably merged to constitute the branches of a Y-structure having a common stem 22 which is flexibly connected at its rear end by a ball and socket or other universal joint 23 with one of the forward cross pieces 5 of the under frame.

The vehicle body supporting springs located at the forward portion of the structure are also desirably in the form of elliptic springs 24 having connection at their top portions with the forward end of the vehicle body under frame and at their bottom portions with the reach rods 21, the points of connection of the elliptic springs 24 (or other cushion support) with the vehicle body under frame and reach rods 21 being between the axes of the vehicle wheels. Where elliptic leaf springs are employed for supporting the vehicle body, the side members 4 are formed of channel irons opening downwardly so that the upper parts of the elliptic springs may be received in such channel irons as indicated clearly in Fig. 6. This partial housing of the upper parts of the elliptic springs serves better to preserve the planes in which such springs vibrate and makes the spring structure more rigid whereby the life of such springs may be materially increased and their operation made more effective. Such location of the elliptic springs also permits of wider spacing between the side members 4 of the under frame.

I have shown and particularly described the employment of a pair of reach rods (as I term them) at each end of the under frame, though it will be apparent that certain of the advantages which I attain may be secured if but one of these pairs is retained. As the invention is illustrated the points of attachment to the rear ends of the reach rods 15 with the shaft casing 9 are close to the planes of rotation of the rear wheels 6, and the points of attachment of the forward ends of the forward reach rods 21 with the knuckle portions 20 and thereby with the cases for the spindles or stub shafts of the forward wheels are brought close to the planes of rotation of the forward wheels.

The cushions that support the vehicle body are shown as being located well between the axes of the forward and rear wheels, whereby with a given location for the vehicle body supporting springs the spacing between the forward and rear wheels may be materially increased so as to increase what is commonly termed the wheel base of the vehicle. This characteristic of the invention is not to be limited to the close proximity of the points of connection of the outer ends of the reach rods with the wheel structures. By this characteristic of the invention not only may the wheel base of the vehicle be materially increased with a given space between the forward and rear vehicle body supporting cushions or springs but the amplitude of spring vibration is shortened in proportion to the shocks whereby the amplitude of movement of the under frame is correspondingly reduced to reduce the amplitude of consequent movement of the vehicle body, vehicle motor, and the power connections between the vehicle motor and the driving wheels 6.

By bringing the points of connection of the outer ends of the reach rods close to the planes of rotation of the vehicle wheels the weight of the under frame and parts of the vehicle structure carried thereby is supported very close to the planes of rotation of the wheels whereby the tendency of the weight to warp the wheels from their normal planes is very materially reduced. By thus connecting the outer ends of the rear reach rods close to the planes of rotation of the driving wheels the tendency to warp the driving wheels out of their normal planes due to the propelling action is materially reduced. By connecting the outer ends of the rear reach rods with the mountings for the brake members that are complemental to the brake members moving with the rear wheels 6 the force of the braking strains is removed from the rear vehicle body supporting springs 18, such strains being transferred directly to the under frame through the intermediation of the rear reach rods so that the rear reach rods not only materially oppose any tendency of the rear wheels to warp upon the application of the brakes, by the close attachment of the rear ends of the rear reach rods to the planes of the rear wheels, but the normal function of the springs 18 is not interfered with by braking operations, a result which is not dependent upon the proximity of attachment of the rear ends of the rear reach rods to the planes of rotation of the rear wheels. I do not limit myself to the separate formation and separable relation of the vehicle body and under frame.

By placing the rear vehicle body supporting elliptic springs closer to the motor and farther away from the rear vehicle wheels (which can be done by supporting these springs upon the rear reach rods) strains upon the motor are correspondingly reduced as for example in braking, and the starting of the motor, said springs being in better position, than hitherto, to cushion the motor in the starting and stopping of the vehicle. By placing these reach rods, at their rear or outer end, close to the planes of rotation of the initially driven vehicle wheels the strain upon the motor is further reduced since the leverage distance between the rear ends of the reach rods and the rear wheels is reduced; that is owing to such an arrangement of the reach rods the bending and twisting strains upon the motor driven shaft is reduced correspondingly to reduce the strains upon the motor. Because of the above outlined arrangement of the supporting elliptic springs the action of the brakes is correspondingly softened so as to reduce the strains of such action upon the motor and correspondingly lessen the braking shocks to the occupants.

Claims respecting the braking mechanism and the association thereof with the reach rods are included in my division of this application Serial No. 831,367, filed April 13, 1914.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A vehicle including a vehicle body carrying frame, rear vehicle wheels for supporting the rear of said frame, a rear axle housing extending substantially horizontally between the hubs of the rear wheels, a pair of substantially straight reach rods extending diagonally from points on said frame to more widely separated points on said rear axle housing and a spring between said frame and each of said reach rods bearing upon said reach rods at a point between the ends thereof located in a vertical plane passing through the two points of attachment of said reach rods.

2. A vehicle including a vehicle body carrying frame, rear vehicle wheels for supporting the rear of said frame, a rear axle housing extending substantially horizontally between the hubs of the rear wheels, a pair of substantially straight reach rods extending diagonally from points on said frame to more widely separated points on said rear axle housing and a full elliptic spring between said frame and each of said reach rods bearing upon said reach rods at a point between the ends thereof located in a vertical plane passing through the two points of attachment of said reach rods.

In witness whereof, I hereunto subscribe my name this twenty-first day of October A. D. 1913.

ROLAND S. FEND.

Witnesses:
G. L. CRAGG,
ETTA L. WHITE.

Copies of this patent may be obtained for five cents each, by addressing the "Commissioner of Patents Washington, D. C."